United States Patent
Runcie et al.

(10) Patent No.: US 9,465,540 B2
(45) Date of Patent: Oct. 11, 2016

(54) APPLICATION AND SYSTEM SETTINGS CONFIGURATION FILTERING DURING PHYSICAL TO VIRTUAL HARD DISK CONVERSION

(75) Inventors: George Runcie, Santa Barbara, CA (US); Derek Rodrigues, Ojai, CA (US)

(73) Assignee: Open Invention Network, LLC, Durham, NC (US)

(*) Notice: Subject to any disclaimer, the term of this patent is extended or adjusted under 35 U.S.C. 154(b) by 1176 days.

(21) Appl. No.: 12/469,240

(22) Filed: May 20, 2009

(65) Prior Publication Data
US 2010/0299478 A1    Nov. 25, 2010

(51) Int. Cl.
*G06F 12/00* (2006.01)
*G06F 3/06* (2006.01)
*G06F 9/455* (2006.01)

(52) U.S. Cl.
CPC ............ *G06F 3/0607* (2013.01); *G06F 3/067* (2013.01); *G06F 3/0664* (2013.01); *G06F 9/455* (2013.01)

(58) Field of Classification Search
CPC .... G06F 3/0607; G06F 3/0664; G06F 3/067; G06F 9/455
See application file for complete search history.

(56) References Cited

U.S. PATENT DOCUMENTS

| | | | |
|---|---|---|---|
| 6,003,044 A * | 12/1999 | Pongracz et al. | |
| 6,415,300 B1 * | 7/2002 | Liu | 707/652 |
| 6,785,786 B1 * | 8/2004 | Gold et al. | 711/162 |
| 7,743,028 B1 * | 6/2010 | Stringham et al. | 707/646 |
| 2008/0154990 A1 * | 6/2008 | Jankowsky et al. | 707/205 |
| 2009/0037680 A1 * | 2/2009 | Colbert | G06F 3/0617 711/162 |
| 2009/0198805 A1 * | 8/2009 | Ben-Shaul et al. | 709/222 |

* cited by examiner

*Primary Examiner* — Larry Mackall
(74) *Attorney, Agent, or Firm* — Haynes and Boone, LLP

(57) ABSTRACT

During conversion and transfer of data from a physical machine to a virtual hard disk, a transmuter generates a catalog of contents of the physical machine. Catalog entries are compared to a set of alterations templates which alter matching data. The altered data is then stored in the virtual hard disk. Alterations templates may include filters that exclude unwanted or duplicated catalog entries, mapping filters that transfer source catalog entries to target locations on the virtual hard disk, and add-on filters that add additional data or location references to catalog entries. The disclosed process allows modifications to be made in a systematic way during data transfer.

17 Claims, 4 Drawing Sheets

APPLICATION AND SYSTEM SETTINGS CONFIGURATION FILTERING DURING PHYSICAL TO VIRTUAL HARD DISK CONVERSION

FIELD OF THE INVENTION

This disclosure relates to the provision of virtual hard disks and in particular to the transfer of data from a physical machine to a virtual hard disk.

BACKGROUND OF THE INVENTION

The advent of high-speed communications has seen greater transport of data. One advantage of high speed data is that data may be stored in a central, secure location and provided on demand to remote or local physical machines. Applications have been developed that provision a virtual hard disk on a secure server that allow a user to interact with a hard disk in a manner that emulates the operating system of a typical physical machine.

Typically, when a physical machine is implemented as a virtual machine, the entire contents of the physical machine are copied first. If a user desires to make configuration changes, these must be done after the conversion of the physical machine to the virtual machine. This can be particularly cumbersome where multiple physical machines are to be implemented as virtual machines.

Many physical machines fail to meet virtualization requirements because they either fail to meet security requirements or the pre-configuration cost is higher than creating a new virtual machine. For example, the source machine could have excessive temporary data that would increase conversion time and network bandwidth utilization.

What is required, is a system, method and computer readable medium that provides greater flexibility and efficiency for converting physical machine systems to virtual machines.

SUMMARY OF THE INVENTION

In one aspect of the disclosure, there is provided a method for transferring data from a physical machine to a virtual hard disk. The method comprises receiving the data from a physical machine, comparing the data to at least one alterations template, altering the data in accordance with the at least one alterations template, and storing the altered data in a virtual hard disk.

In one aspect of the disclosure, there is provided a system for storing data of a physical machine in a virtual hard disk format. The system comprises at least one transmuter and at least one datastore that stores a plurality of filtering parameters. The transmuter is configured to convert physical hard disk data to virtual hard disk data in accordance with the plurality of filtering parameters.

In one aspect of the disclosure, there is provided a computer-readable medium comprising computer-executable instructions for execution by a processor, that, when executed, cause a first processor to receive contents of a physical hard disk, transform the contents in accordance with one or more alterations templates, and transfer the transformed contents to a virtual hard disk.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
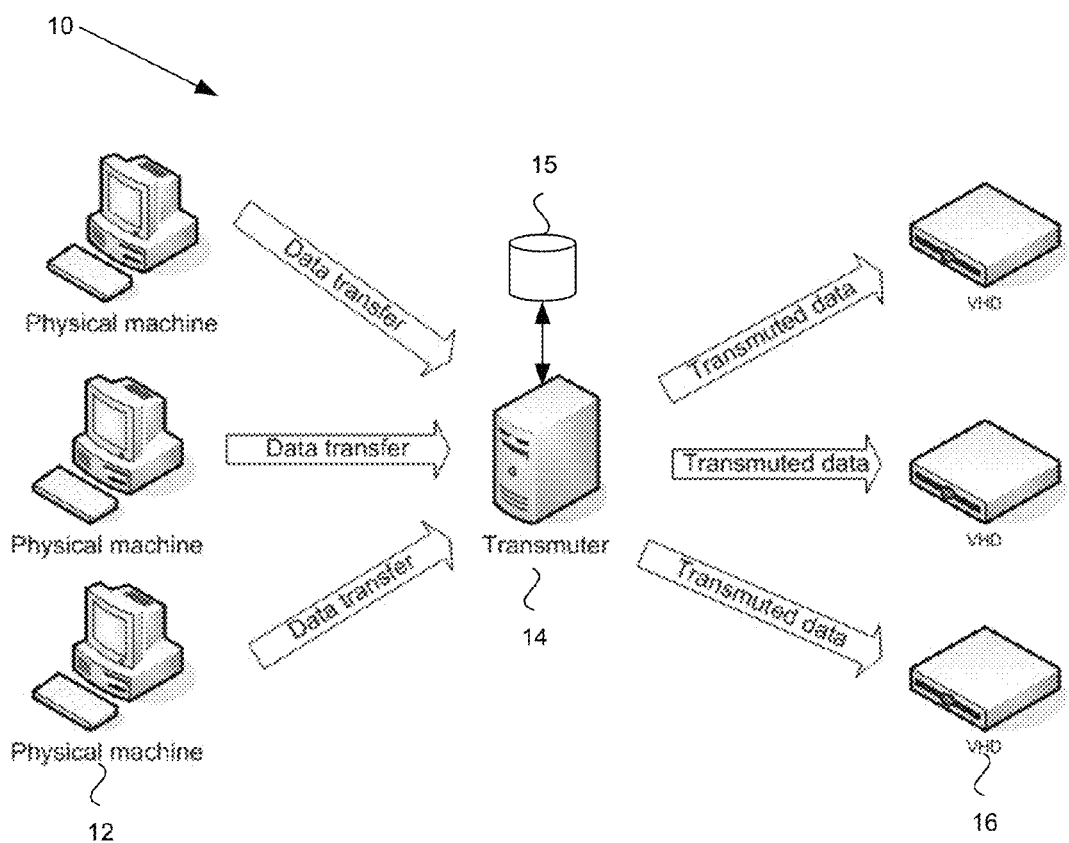
FIG. 1 illustrates a system for transferring data from a physical machine to a virtual hard disk.

In FIG. 1 there is shown a system 10 for converting a plurality of physical machines 12 into a plurality of virtual hard disks 16. In the system 10, the conversion of the physical hard disk data to virtual hard disk data is performed by a transmuter 14. The transmuter 14 is a centralized computer process performed on a physical machine such as a machine operating as a virtual network host. The transmuter 14 receives incoming data from a physical machine 12 and converts it to a virtual hard disk format.

In one embodiment, the transmuter 14 performs additional operations on the incoming data such as filtering, altering or appending new information. The additional operations may be driven by one or more alterations templates stored in the transmuter 14 or an associated data storage 15. Alteration templates may be created by a management console. For example, while selecting a source and target, the alterations templates may be selected from a template pool which provides pre-configured settings which the administrator can modify. Changes can include additional file filters (for example: exclude % TEMP % directory), application filters (add/remove application files) and security filters (run virus scan on *.exe files).

Figure 2:
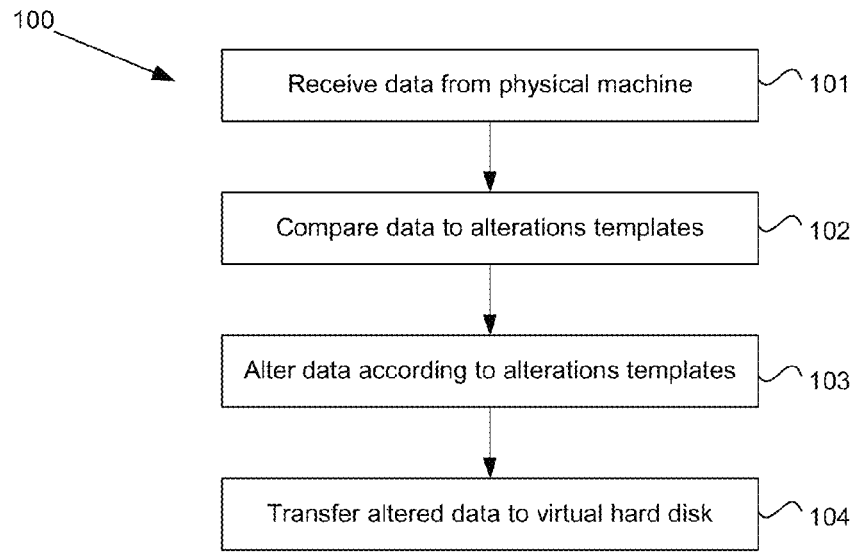
FIG. 2 illustrates a method for transferring data from a physical machine to a virtual hard disk.

A method for transferring data from a physical machine to a virtual hard disk is illustrated in the flowchart 100 of FIG. 2. At step 101, the transmuter 14 receives data from a physical machine 12. The received data is compared to one or more alterations templates (step 102). The data is altered depending on the comparison with the alterations templates at step 103. For example, the date may be altered by filtering the data, altering the data or appending new information. At step 104, the altered data is transferred to a virtual hard disk for storage.

Figure 3:
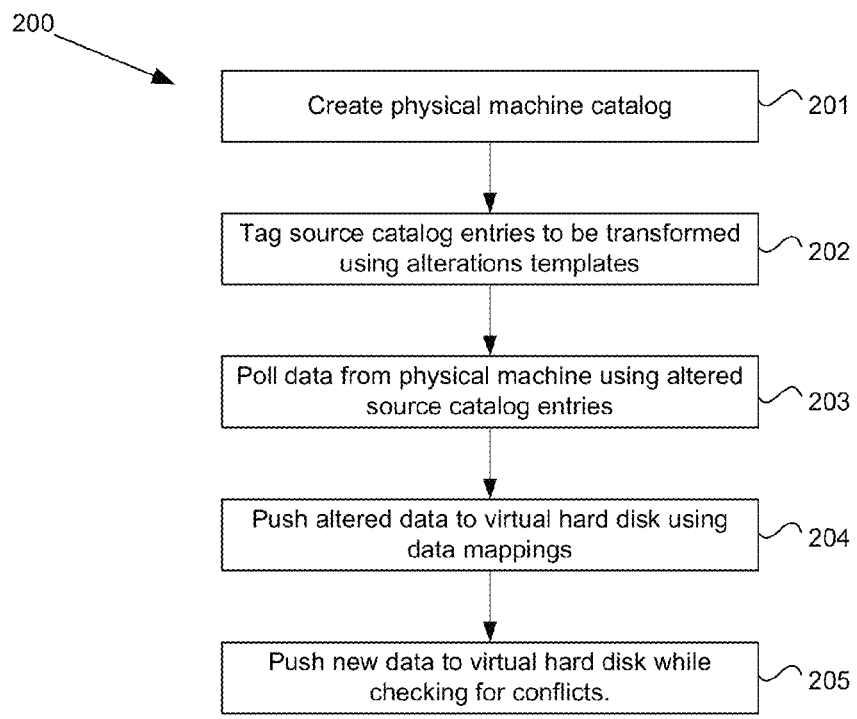
FIG. 3 illustrates a method for cataloging and altering physical machine contents.

A more detailed process of the data transfer is illustrated in the flowchart 200 of FIG. 3. As an initial step 201, a physical machine catalog is created that represents the physical machine contents for a particular physical machine. That is, the resulting source catalog will be a skeleton representation of the source machine. At step 202 the transmuter uses alterations templates to tag source catalog entries that are to be transformed. Amongst others, the alterations templates may include filters, data mappings and add-on data templates. The transmuter polls data from the physical machine using the altered source catalog entries 203. Catalog entries that were excluded are not polled. Data corresponding to altered source catalog entries is altered accordingly. The transmuter then pushes the data (step 204) to the virtual hard disk according to data mappings. For example, if a drive mapping from c drive to d drive was included in the catalog building process for the physical machine, then the transmuter 14 will push c drive contents to the drive location of the virtual hard disk. At step 205, the transmuter 14 pushes new data to the virtual hard disk using virtual hard disk catalog entries while verifying for conflicts. An example of a conflict may be where a source machine has the same directory path on separate drives. Example: c:\data\temp and d:\data\temp. A mapping from d to c will create a conflict when performing a conversion because d:\data\temp can overwrite c:\data\temp. The mapping may have a conflict resolution that indicates that conflict paths are mapped to a special directory on the target. In the example above, d:\data\temp would be transferred to c:\conflict\data\temp. The administrator can then decide what to do with all the conflict data that was transferred during the conversion.

In one embodiment, an alterations template may comprise an exclude filter that causes specified source catalog entries to be removed from the source catalog so that those entries are not transferred to the virtual hard disk. For example, an exclude filter may indicate not to transfer c:\temp or files located in the recycle bin. Other examples may include an exclude template that lists all internet temp data directories not to be transferred such as C:\Documents\_and\_Settings\LocalService\Local Settings\Temp, or C:\Documents\_and\_Settings\Administrator\Local Settings\Temp.

In one embodiment, an alterations template may comprise a data mapping template. The physical machine may include mappings of files, directories and drives from a source location to a target location. The data mapping template detects these mappings and causes the transmuter 14 to transfer the target to the equivalent target location of the virtual hard disk rather than the equivalent source location of the virtual hard disk. That is, data mapping templates can be used to transform source catalog entries to a desired target location of the virtual hard disk. For example, a mapping of D drive to C drive would produce the following path mappings: "D:\Program File" mapped to "C:\Program Files" when moving source contents in "D:\Program File"

In one embodiment, an alterations template may comprise an add-on data template that can be used to add entries and location references to a virtual hard disk template. In one example, an administrator may require all virtual machines to have a virus scanner on all virtual machines. A template can indicate an external application repository in the network. During conversion, the applications files such as the required virus scanner installation files are retrieved from the repository and installed in the new virtual machines as part of the conversion process.

The catalog entries may be organized into category types, for example including categories for system files, configuration settings, user files etc. In one embodiment, the alterations template may act on particular categories of catalog entries. For example, particular system files and/or configuration files might be removed to avoid duplication or might be modified to include a standardized set of configuration settings and parameters.

Typically, all user files will be transferred without changes to the data. However, many program files, libraries, system files etc which are required to be individually stored on each physical machine may not be required for each instance of a virtual machine. Such files may be removed or altered to include a mapping to a shared instance of the file on the virtual machine that might be shared across multiple virtual hard disks. In addition, the types of filters described above can eliminate unnecessary and unsecure properties from being transferred.

Figure 4:
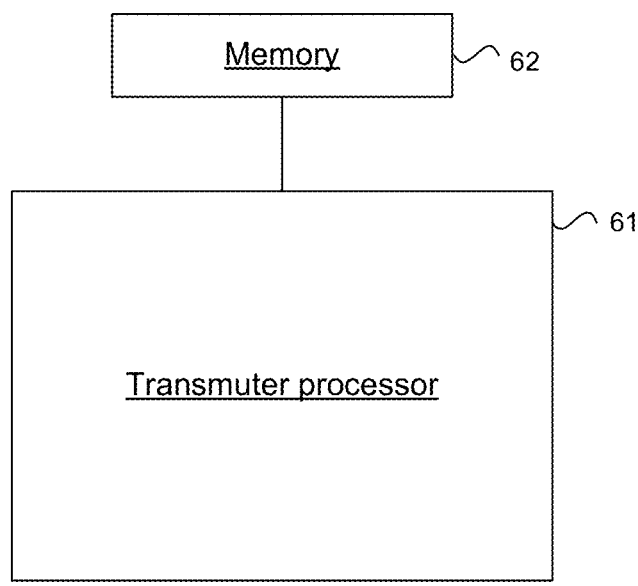
FIG. 4 illustrates a processor and memory of a machine that executes a transmuter application.
Figure 5:
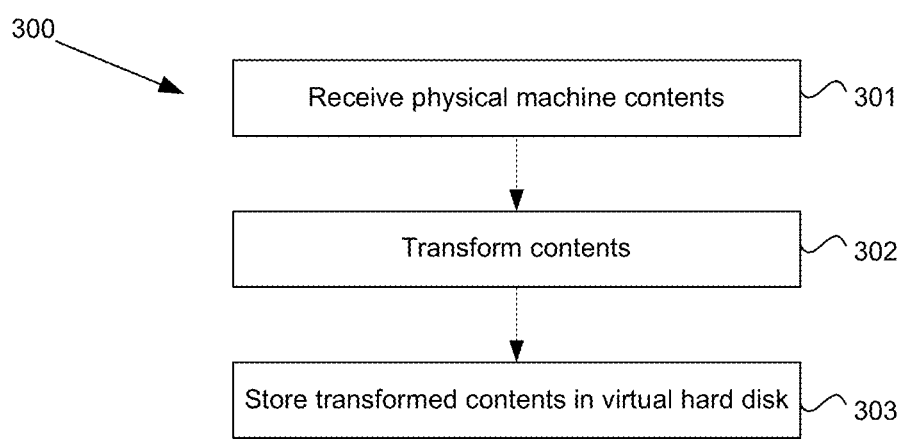
FIG. 5 illustrates an instruction set that may be executed on the processor and memory of FIG. 4.

The components of the system 10 may be embodied in hardware, software, firmware or a combination of hardware, software and/or firmware. In a hardware embodiment, the transmuter application may be executed on a device, such as a computer, etc including a processor 61 operatively associated with a memory 62 as shown in FIG. 4. The memory 62 may store instructions that are executable on the processor 61. An instruction set 300 that may be executed on the processor 61 is depicted in the flowchart of FIG. 5. Specifically, when executed, the instruction set 300 allows the processor to receive contents of a physical hard disk (step 301) and transform the contents (step 302) such as by applying one or more alterations templates from the memory 62 to the contents. The processor may then store the transformed contents in a virtual hard disk (step 303). The virtual hard disk may be provided in part by the memory 62.

Figure 6:
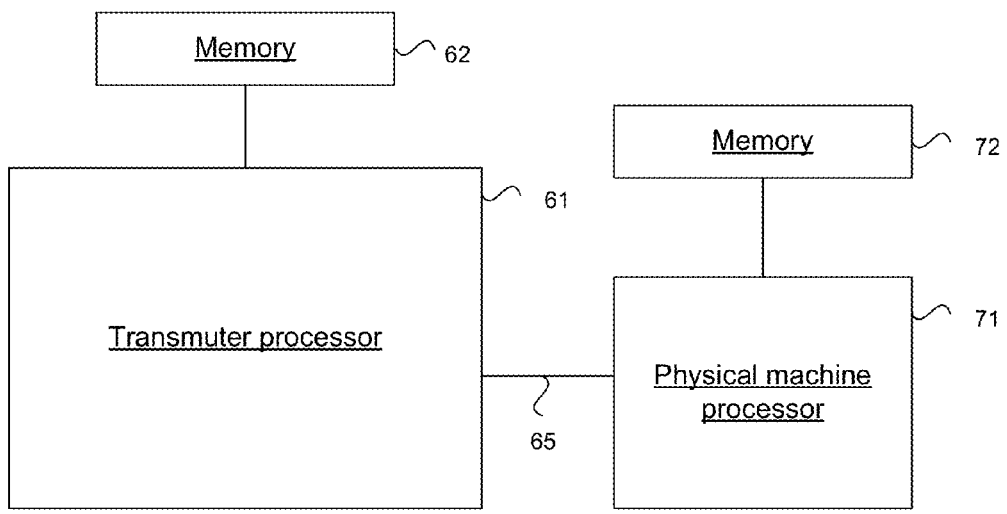
FIG. 6 illustrates the processor and memory of FIG. 4 in association with a processor and memory of a physical machine.

The transmuter processor 61 may communicate with a processor 71 of a physical machine as shown in FIG. 6 through a suitable communications link 65. The physical machine may have a physical hard disk, such as memory 72, from which the hard disk contents can be retrieved.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for transferring data from a physical machine to a virtual hard disk comprising:
   receiving the data from a physical machine;
   comparing the data to at least one alterations template selected from an alterations template pool comprising a plurality of alterations templates;
   tagging catalog entries of contents of the physical machine to be altered based on information included in the at least one alterations template;
   polling data from the physical machine using the tagged source catalog entries;
   comparing the catalog entries to the at least one alterations template;
   altering the data corresponding to the tagged source catalog entries in accordance with the at least one alterations template, wherein the altering the data comprises removing at least one source catalog entry from the contents of the physical machine catalog entries; and
   storing the altered data in a virtual hard disk.

2. The method according to claim 1 wherein the at least one alterations template comprises at least one exclude filter, wherein data matching the at least one exclude filter is excluded from the altered data.

3. The method according to claim 1 wherein the at least one alterations template comprises at least one data mapping template, wherein data matching the at least one data mapping template is stored in a location of the virtual hard disk that is equivalent to a target location of the data mapping of the physical machine.

4. The method according to claim 1 wherein the at least one alterations template comprises at least one add-on data template, wherein data matching the at least one add-on data template is altered to include additional data.

5. The method according to claim 4 wherein the additional data comprises one or more additional entries.

6. The method according to claim 4 wherein the additional data comprises one or more additional location references.

7. A system for storing data of a physical machine in a virtual hard disk format, the system comprising:
at least one transmuter; and
at least one datastore that stores a plurality of filtering parameters;
wherein the at least one transmuter is configured to
convert physical hard disk data to virtual hard disk data in accordance with one or more of the plurality of filtering parameters of at least one alterations template selected from an alterations template pool comprising a plurality of alterations templates;
tag catalog entries of contents of the physical machine to be altered based on information included in the at least one alterations template;
poll data from the physical machine using the tagged source catalog entries;
compare the catalog entries to the at least one alterations template; and
alter the data corresponding to the tagged source catalog entries in accordance with the at least one alterations template by removing at least one source catalog entry from the contents of the physical machine catalog entries.

8. The system according to claim 7 wherein the at least one transmuter is configured to:
determine one or more conflict paths; and
map the one or more conflict paths to a specified directory on a target virtual hard disk.

9. The system according to claim 7 wherein the at least one transmuter is configured to transfer the physical hard disk data to a virtual hard disk.

10. The system according to claim 7 wherein the datastore stores a plurality of filter templates, each filter template comprising one or more of the filtering parameters.

11. The system according to claim 10 comprising a management console that is configured to allow a user to select one or more of the filtering templates to apply to a physical hard disk.

12. The system according to claim 7 wherein the plurality of filtering parameters comprise at least one exclude filter.

13. The system according to claim 12 wherein the exclude filter is configured to exclude one or more temporary directories from the physical hard disk.

14. The system according to claim 12 wherein the exclude filter is configured to exclude any recycle bin files from the physical hard disk.

15. The system according to claim 7 wherein the at least one transmuter is configured to generate a catalog of contents of the physical hard disk.

16. A non-transitory computer-readable storage medium comprising computer-executable instructions for execution by a processor, that, when executed, cause a first processor to:
receive contents of a physical hard disk;
transform the contents in accordance with one or more alterations templates selected from an alterations template pool comprising a plurality of alterations templates;
tag catalog entries of contents of the physical hard disk to be altered based on information included in the at least one alterations template;
poll data from the physical hard disk using the tagged source catalog entries;
compare the catalog entries to the at least one alterations template;
transfer the transformed contents to a virtual hard disk; and
alter the data corresponding to the tagged source catalog entries in accordance with the at least one alterations template by removing at least one source catalog entry from the contents of the physical machine catalog entries.

17. The non-transitory computer-readable storage medium according to claim 16 comprising instructions that cause the processor to exclude one or more files from the transformed contents such that the one or more excluded files are not transferred to the virtual hard disk.

* * * * *